…

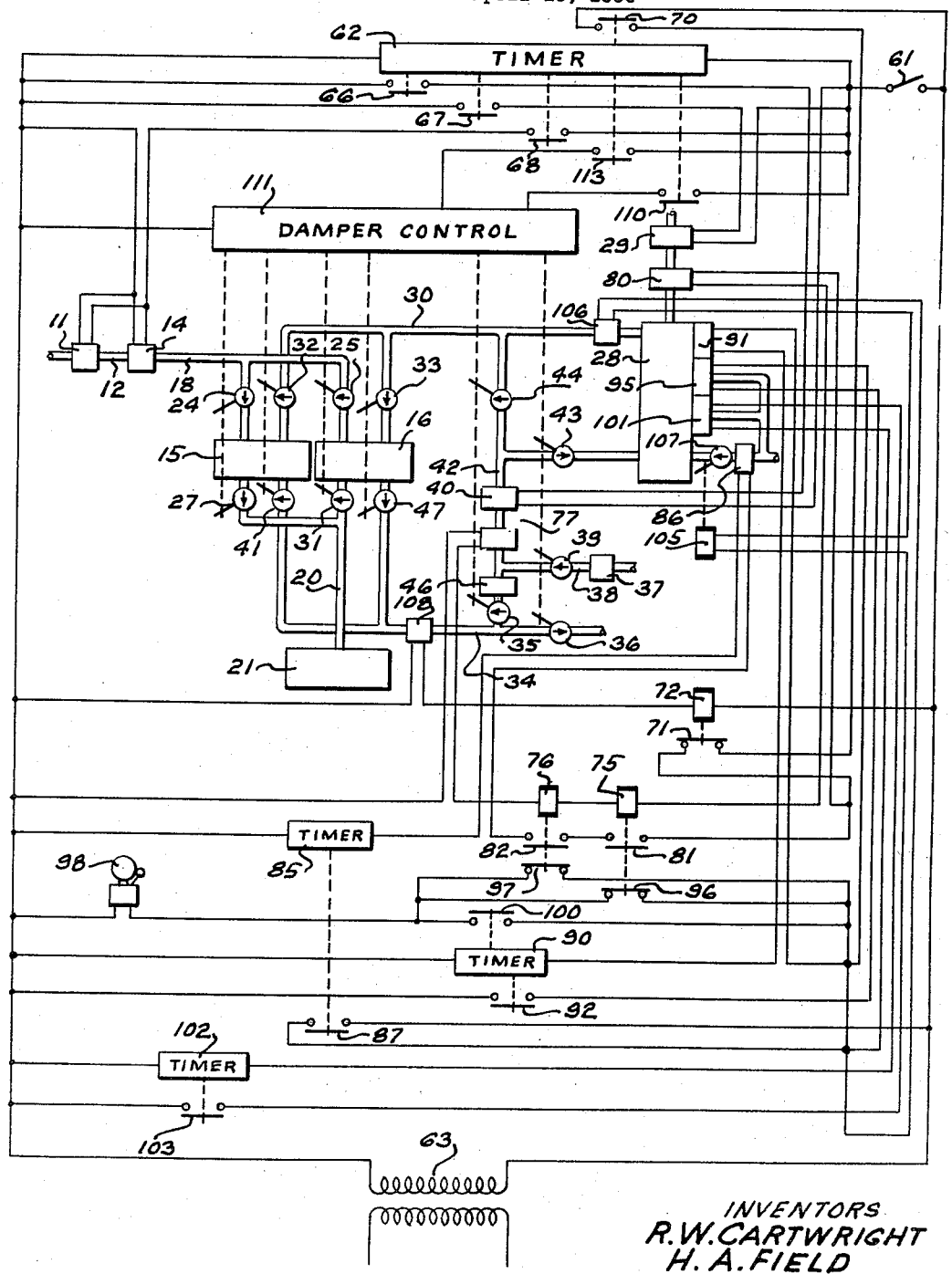

United States Patent Office 2,878,890
Patented Mar. 24, 1959

2,878,890

CONTROL CIRCUITS

Robert W. Cartwright, Naperville, Herbert A. Field, Hillside, Floyd H. Kruger, Western Springs, and Lester W. Malzahn, Maywood, Ill., assignors to Western Electric Company, Incorporated, New York, N.Y., a corporation of New York Application April 19, 1956, Serial No. 579,206

4 Claims. (Cl. 183—4.1)

This invention relates to control circuits and more particularly to circuits for controlling automatically operated dehumidifying systems.

An object of this invention is to provide a circuit for controlling an automatically operated dehumidifying system.

One embodiment of the invention for controlling a dehumidifying system utilizing refrigeration and adsorption type dehumidifiers may include a plurality of relays, contacts and timers connected so as to control dampers in the system whereby refrigerated air is passed through a first silica gel layer while heated air is passed through a second silica gel layer to evaporate the water from it. The circuit then actuates the system whereby cooled air is passed through the reactivated silica gel to lower its temperature, whereupon the dampers are operated to direct the refrigerated air through the second silica gel layer and heated air through the first silica gel layer.

Other objects and advantages of the invention will become apparent by reference to the following detailed description and the accompanying drawing illustrating a preferred embodiment of the invention, in which there is shown a schematic diagram of the control circuit showing its connections to a diagrammatically illustrated dehumidifying system.

Referring now in detail to the drawing, a switch 61 is closed at zero time to connect a control timer 62 to a power supply transformer 63. At five minutes after zero time the control timer 62 closes contactors 66, 67 and 68. The closing of contactor 66 applies power from the transformer 63 to an activating-cooling fan 40 of a dehumidifying system such as that having features disclosed and claimed in co-pending application Serial No. 579,205, filed April 19, 1956, for "Dehumidifying Systems," by F. H. Kruger, now abandoned. The closing of contactor 67 applies power to an induced draft fan 29 which exhausts products of combustion from a gas fired air heater 28 of the dehumidifying system; and the closing of contactor 68 applies power to a refrigeration unit 14 and a fan 11 of the dehumidifying system. With dampers 24, 25, 27, 31, 32, 33, 35, 36, 39, 41, 43, 44 and 47 of the dehumidifying system set as illustrated in the drawing, the fan 11 moves air through a duct 12, the refrigeration unit 14, a duct 18, a compartment 15 containing a layer of dry silica gel, and a duct 20 to a room or space 21 requiring dehumidified air; and the activating-cooling fan 40 moves air through a path including a filter 37, a duct 38, a duct 42, the heater 28, a duct 30, a compartment 16 containing a layer of silica gel, and a duct 34 of the dehumidifying system.

At the end of five minutes the control timer 62 closes a contactor 70 to apply power through a closed contactor 71 of a relay 72 to relays 75 and 76 connected in series with a diaphragm switch 77 mounted in the duct 38 and a diaphragm switch 80 mounted in a duct connecting the induced draft fan 29 to the heater 28. If the induced draft fan 29 and the activating-cooling fan 40 are functioning properly, the diaphragm switches 77 and 80 are closed and the relays 75 and 76 will be energized to close contactors 81 and 82 and to open contactors 96 and 97, respectively. The closing of contactors 81 and 82 applies power to a timer 85 connected in series with a pressure switch 86 mounted in the gas supply line of the heater 28. If the gas pressure in the heater supply line is at a proper value, the switch 86 will be closed and the timer 85 will be energized. The contactors 96 and 97 are connected in parallel with each other and in series with an alarm bell 98. At the end of five minutes (ten minutes from zero time), the timer 85 closes a contactor 87 to apply power to a timer 90 connected in series with a switch 91 which is closed when there is no gas flame in the heater 28. Since there is no flame in the heater 28, the timer 90 will be energized and will close a contactor 92 to energize a plurality of ignition coils and to open a pilot gas valve, which coils and valve are mounted in a portion 95 of the heater 28. This lights a pilot flame in the heater 28. If the pilot flame fails to light or is extinguished after lighting, the timer 90 closes a contactor 100 connected in parallel with the contactors 96 and 97 to actuate the alarm bell 98.

The pilot flame in the heater 28 closes a switch and opens a gas valve mounted in a portion 101 of the heater 28 whereby additional gas enters the heater 28 through the portion 101 and is lighted by the pilot flame. The closing of the switch in the heater portion 101 energizes a timer 102 which closes a contactor 103. The closing of the contactor 103 applies power to a relay 105 connected in series with a temperature switch 106 mounted in the duct 30 leading from the heater 28. When the temperature of the air leaving the heater 28 drops below a predetermined value the switch 106 closes, thereby energizing the relay 105 which opens a valve 107 to supply more gas to the heater 28. Conversely, when the temperature of the air leaving the heater rises above the predetermined value, the switch 106 opens whereby the relay 105 is deenergized and the valve 107 closes. Thus, the temperature of the air leaving the heater is regulated. At the end of another minute of operation (eleven minutes from zero time) the timer 90 opens the contactor 92 to deenergize the ignition coils and close the pilot gas valve mounted in the heater portion 95. Gas entering the heater 28 through the heater portion 101 burns constantly and serves to light any gas which enters the heater through the valve 107. If the induced draft fan 29 or the activating-cooling fan 40 fails the diaphragm switch 80 or 77, respectively, will open to deenergize the relays 75 and 76, whereupon the contactors 96 and 97 close to energize the alarm bell 98.

At this stage, air is moved through the refrigeration unit 14 and the silica gel layer in the compartment 15 to the space 21. This air is cooled and partially dehumidified as it passes through the refrigeration unit 14, and is further dehumidified as it passes through the layer of silica gel. At the same time the activating-cooling fan 40 is moving air through a filter 37 and into the heater 28 where its temperature is raised to a point sufficient for evaporating water from the silica gel layer in the compartment 16. This heated air passes through this silica gel layer and reactivates it.

At the end of 4 hours and 15 minutes (4 hours and 26 minutes from zero time), the control timer 62 opens the contactor 70 to deenergize relays 75 and 76, whereupon the contactors 81 and 82 open to deenergize the timer 85. If, however, the temperature of the air leaving the silica gel layer in the compartment 16 rises above a predetermined value before the end of 4 hours and 26 minutes, a temperature switch 108 in the duct 34 closes to energize the relay 72 which opens the contactor 71 to deenergize the relays 75 and 76. This opens contactors 81 and 82 and deenergizes the timer 85. When timer 85 is deenergized the contactor 87 opens, thereby deenergizing the timer 102. As the timer 102 is deenergized the gas valve in the heater portion 95 is closed and the contactor 103 is opened. When the contactor 103 opens it deenergizes the relay 105, which closes the gas valve 107 whereby the heater 28 is no longer operating.

At the end of an additional 10 minutes (4 hours and 36 minutes from zero time) the control timer 62 closes a contactor 110 to energize a damper control 111 which closes the dampers 36, 39 and 43 and opens the dampers 35 and 44, after which the timer 62 opens the contactor 110. The activating-cooling fan 40 now circulates air in a closed loop which includes the reactivated silica gel in the compartment 16 and a water cooled heat exchanger 46. The circulating air cools the silica gel layer in the compartment 16 to render it effective as an adsorbent and is in turn kept cool by the heat exchanger 46.

At the end of 20 minutes (4 hours and 56 minutes from zero time) the control timer 62 opens the contactor 67 to stop the induced draft fan 29 and at the end of another hour (5 hours and 56 minutes from zero time) the control timer 62 opens the contactors 66 and 68 to stop the refrigeration unit 14, the fan 11, and the activating-cooling fan 40.

Upon the expiration of 4 minutes (6 hours from zero time) the control timer closes a contactor 113 to energize the damper control 111 which opens dampers 25, 31, 32 and 41, and closes valves 24, 27, 33 and 47 after which the timer 62 opens the contactor 113. The refrigeration unit 14 and the fan 11 are now connected to the compartment 16 containing the reactivated silica gel layer, and the activating-cooling fan 40 and the heater 28 are connected to the compartment 15 containing the saturated silica gel layer.

At the end of 5 minutes (6 hours and 5 minutes from zero time) the control timer 62 closes the contactors 66, 67 and 68 and the cycle is repeated as above-described.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a dehumidifying system including a network of ducts connecting a refrigeration unit, a gas-fired heater, and a cooler to first and second masses of moisture adsorbing material, a control network comprising a power supply, timed circuit control means for connecting the power supply to a plurality of fans in the dehumidifying system whereby partially dehumidified air from the refrigeration unit is passed through the first mass of moisture adsorbing material for further dehumidification and air is moved through the heater and the second mass of moisture adsorbing material, circuit means connected to and operated by the circuit control means for connecting the power supply to the heater at the end of a time delay, means responsive to the application of power to the heater for opening a main gas valve of the heater to render said heater operative, circuit safety means for disconnecting the power supply from the heater if it fails to operate, said circuit control means disconnecting said power supply from the heater to render it inoperative at the end of a timed interval if said heater is operating properly, and damper control means operated by the circuit control means after the heater is rendered inoperative for actuating dampers in the dehumidifying system to close the ducts between the heater and said second mass and to open the ducts between the cooler and the second mass whereby coil air is circulated to cool said second mass, said circuit control means actuating the damper control means at the end of a further time delay to operate the dampers in the dehumidifying system whereby air from the refrigeration unit passes through the second mass of moisture adsorbing material and air from the heater passes through said first mass.

2. In a dehumidifying system including a refrigeration unit, a network of ducts, a gas-fired air heater, an air cooler, a first layer of a moisture adsorbing material, and a second layer of said material, a control network comprising a power supply, circuit control means for connecting the power supply to a plurality of fans in the dehumidifying system, damper control means actuated by the circuit control means for actuating dampers in said system whereby air moves from the refrigeration unit to the first layer of moisture adsorbing material and other air moves from the heater to the second layer, circuit means operated by the circuit control means after a time delay for opening a pilot gas valve and igniting a pilot flame in the heater, means responsive to the lighting of said pilot flame for opening a main gas valve of the heater to render the heater operative, circuit safety means for closing the main gas valve if said heater fails in operation, means responsive to a rise in temperature of the heated air leaving the second layer for rendering the heater inoperative, and damper control means operated by the circuit control means at the end of a timed interval to disconnect the heater from said second layer and to connect the air cooler thereto, said damper control means being operated by the circuit control means at the end of a further timed interval to actuate the dampers whereby air from the refrigeration unit passes through the second layer and air from the heater passes through the first layer to dry it.

3. In a dehumidifying system including a refrigeration unit, a network of ducts, a gas-fired air heater, an air cooler, a first layer of a moisture adsorbing material, and a second layer of said material, a control network comprising a power supply, circuit control means for connecting the power supply to a plurality of fans in the dehumidifying system, damper control means actuated by the circuit control means for actuating dampers in said system whereby air moves from the refrigeration unit to the first layer of moisture adsorbing material and other air moves from the heater to the second layer, circuit means operated by the circuit control means after a time delay for opening a pilot gas valve and igniting a pilot flame in the heater, means responsive to the lighting of said pilot flame for opening a main gas valve of the heater to render the heater operative, circuit safety means for closing the main gas valve if said heater fails in operation, additional circuit safety means for closing the main gas valve if one of said fans fails in operation, said circuit control means actuating said circuit safety means to close the main gas valve at the end of a predetermined time interval, and damper control means operated by the circuit control means at the end of a timed interval to disconnect the heater from said second layer and to connect the air cooler thereto, said damper control means being operated by the circuit control means at the end of a further timed interval to actuate the dampers whereby air from the refrigeration unit passes through the second layer and air from the heater passes through the first layer to dry it.

4. In a dehumidifying system including first and second layers of moisture adsorbing material connected by ducts to a refrigeration unit, a gas-fired heater, and an air cooler, a control network comprising a power supply, a circuit control timer for connecting the power supply to a plurality of fans in the dehumidifying system to move air from the refrigeration unit through said first layer and to move other air from the heater through said second layer and to also create a draft in the gas-fired air heater, switching means responsive to operation of said fans, means operated by the circuit control timer for connecting the power supply to said switching means at the end of a timed interval, a first timer, a pressure switch connected to the first timer and mounted in a gas supply line of the gas heater, a contactor connected to said first timer and said pressure switch and actuated by the switching means to apply power to the first timer if the gas pressure in said supply line is at a predetermined value, a second timer, a heat switch connected to the second timer and mounted in the gas heater, said heat switch being opened by a flame in the gas heater, a contactor actuated by the first timer for applying power to the second timer if the heat switch is closed, a third timer, said contactor actuated by the first timer also applying power to the third timer, a temperature switch mounted in the duct leading from the gas heater and responsive to a decrease in temperature of the air in the duct, a relay connected to said temperature switch for opening a valve in the gas supply line to the heater, a contactor actuated by the third timer for applying power to the relay to open the gas valve when the temperature switch is closed, a second heat switch responsive to a predetermined rise in temperature of the heated air leaving the second layer of moisture adsorbing material, switching means connected to the second heat switch for disconnecting the first, second and third timers from the power supply to render the gas heater inoperative when the temperature of the air leaving the second layer rises to a predetermined value, and damper control means operated by the circuit control timer for actuating dampers to disconnect the heater from the second layer and for connecting the cooler thereto after the heater is rendered inoperative whereby cooled air is passed through the second layer to lower its temperature, said circuit control timer operating the damper control means at the end of a further timed interval to actuate the dampers whereby air from the refrigeration unit passes through the second layer of moisture adsorbing material and air from the heater passes through the first layer.

References Cited in the file of this patent

UNITED STATES PATENTS

| | | |
|---|---|---|
| 2,200,243 | Newton et al. | May 14, 1940 |
| 2,471,376 | Peters | May 24, 1949 |
| 2,501,280 | Kemp et al. | Mar. 21, 1950 |
| 2,665,769 | Walker et al. | Jan. 12, 1954 |
| 2,699,837 | Van Note | Jan. 18, 1955 |
| 2,747,681 | Schuftan et al. | May 29, 1956 |
| 2,753,950 | Baker et al. | July 10, 1956 |